United States Patent
Stein

[15] 3,660,877
[45] May 9, 1972

[54] CUTOFF TOOL HAVING IMPROVED CUTTING TIP

[72] Inventor: William B. Stein, Barberton, Ohio

[73] Assignee: The Warner & Swasey Company, Cleveland, Ohio

[22] Filed: Apr. 22, 1970

[21] Appl. No.: 30,682

[52] U.S. Cl. ............................................................29/95
[51] Int. Cl. ...........................................................B26d 1/00
[58] Field of Search ..................................29/95, 96, 97, 98

[56] References Cited

UNITED STATES PATENTS

| | | | |
|---|---|---|---|
| 3,475,802 | 11/1969 | Kollar | 29/96 |
| 3,499,198 | 3/1970 | Pollard et al. | 29/96 |
| 3,548,473 | 12/1970 | Stein | 29/95 |

FOREIGN PATENTS OR APPLICATIONS

| | | | |
|---|---|---|---|
| 14,012 | 6/1913 | Great Britain | 29/95 |
| 953,985 | 6/1949 | France | 29/95 |

Primary Examiner—Harrison L. Hinson
Attorney—Freeman & Taylor

[57] ABSTRACT

A cutoff tool characterized by the fact that the cutting portion thereof is provided with a localized cutting area that includes a relatively high degree of compound clearance angles provided in a minimal amount of space for increasing the cutoff efficiency and the tool life, while permitting simplified grinding without impairing tool strength.

7 Claims, 4 Drawing Figures

PATENTED MAY 9 1972        3,660,877

INVENTOR.
WILLIAM B. STEIN
BY Freeman & Taylor
ATTORNEYS 3,660,877

CUTOFF TOOL HAVING IMPROVED CUTTING TIP

BACKGROUND OF THE INVENTION

This invention relates, in general, to metal working tools and in particular to cutting inserts for use in cutting off pieces of stock.

DESCRIPTION OF THE PRIOR ART

In the art of metal cutoff, it has long been known that unusual and relatively heavy forces are encountered due to the fact that the force of cutoff is provided across a transverse surface rather than having a line or point type of contact with the revolving workpiece.

In view of this, the prior art initially employed knife or blade-like types of cutoff tools that were able to absorb this force in a relatively deep supporting area while still effectuating cutoff.

The next significant advance in the art of cutoff came with the advent of Novkov U.S. Pat. No. 2,964,833 which replaced the knife or blade-like construction of the prior art with a two-piece unit that included a support blade and a consumable insert unit of thin, elongate pencil-like configuration.

It is further known in the art of metal cutoff that in order to effectively perform the cutoff operation, it is required that back and side clearance angles be provided, as by grinding, for example, so as to avoid binding of the tool by the opposed side walls of the cut as the tool is advanced during operation.

In inserts of the type shown in the aforementioned Novkov U.S. Pat. No. 2,964,833, these clearance angles were provided throughout the longitudinal depth of the cutting tip portion and generally extended from top to bottom of the insert. Because of the strength problem, the clearance angle has generally been restricted in the past to an angle in the neighborhood of two or three degrees, with this restriction being necessary because of the fact that use of a higher angle would result in a weakening of the tool due to the fact that the stock thickness would be reduced either behind or beneath the cutting edge in the area where the grind terminated.

SUMMARY OF THE INVENTION

It has been discovered that the advantages of a higher clearance angle in connection with both the side and the back clearance can be achieved if the part of the tool adjacent the cutting edge is provided with a compound surface that provides for the side and back clearance that is localized in the cutting edge region.

By this arrangement, the clearance is provided where it is needed by grinding, for example, and yet, by foreshortening the clearance angle and localizing the same in the region of the cutting edge, there is no noticeable decrease in the thickness of the supporting stock beneath and behind of the cutting edge.

As a result of this unique construction, high clearance angles are achieved, and as a result less drag or wear forces are applied to the tool, and as a consequence of this a longer tool life will be achieved.

Such a tip has several additional advantages. Thus, a sufficient area is provided at the rear for adhering the tip to the shank by brazing, for example. Furthermore, a sufficient volume of material is provided to insulate the point of attachment from the heat generated in the cutting zone.

Also, a tip such as this facilitates adhering a relatively brittle tip to a shank with a different heat expansion coefficient as by brazing or similar methods without using special precautions to prevent cracking.

Thus, the tip in question can be manufactured at relatively low cost by conventional means without any loss of tool strength or cutting efficiency.

Production of an improved cutoff tool having the above desired characteristics accordingly becomes the principal object of this invention, with other objects thereof becoming more apparent upon a reading of the following brief specification, considered and interpreted in view of the accompanying drawings.

Of the drawings:

FIG. 1 is a perspective view illustrating the invention in connection with a typical cutoff insert.
FIG. 2 is a top plan view thereof.
FIG. 3 is a side elevational view thereof.
FIG. 4 is a front view thereof.

DETAILED DESCRIPTION OF THE PREFERRED EMBODIMENT OF THE INVENTION

Figure 1:
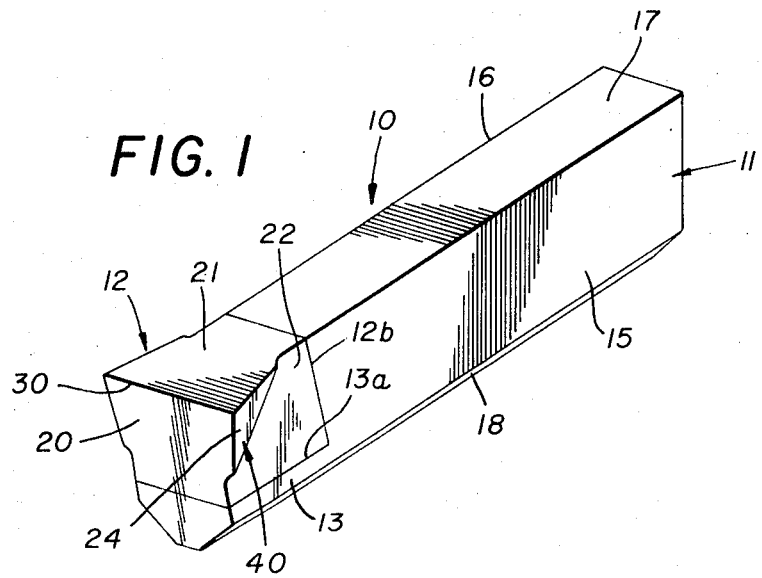

Referring now to the drawings and in particular to FIG. 1, the preferred form of the invention is shown illustrated in connection with a cutoff insert 10, with the insert 10 being of generally thin, elongate pencil-like configuration so as to include an elongate body or shank portion 11 and a cutting tip portion 12, with the tip portion 12 being of hardened material such as carbide and further being received in a forward pocket on the body 11 so as to be supported upon a shelf-like extension 13 of body 11.

In the preferred embodiment of the invention shown, the body 11 includes parallel opposed side walls 15 and 16 (see FIG. 2), a top wall 17 and a truncated V-shaped bottom 18, with the V-shaped bottom 18 preferably extending throughout the length of the insert 10 so as to permit registry with a complementally shaped supporting component in the manner well taught in Novkov U.S. Pat. No. 2,964,833.

Figure 3:
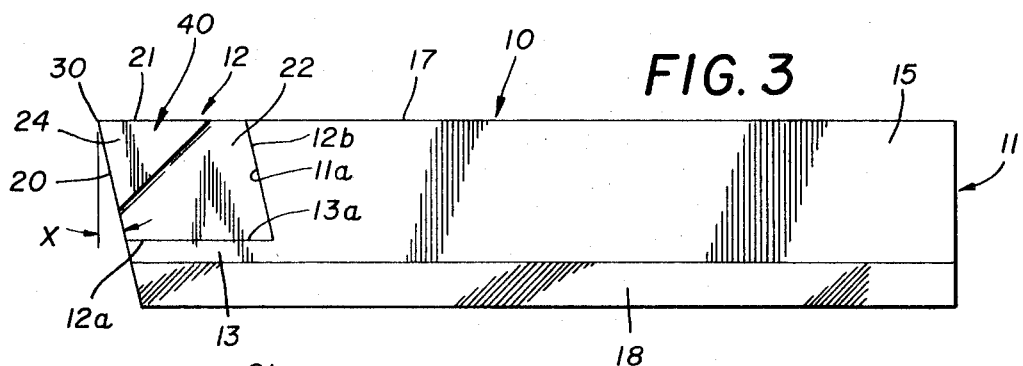

The tip has a generally cube-like appearance that permits a bottom surface 12a thereof to be seated upon the surface 13a of the integral forward extension 13 of body 11 while a rear portion 12b of the tip 12 seats against the upright wall 11a as clearly shown in FIGS. 1 and 3 of the drawings and is secured thereto as by brazing, for example.

Figure 2:
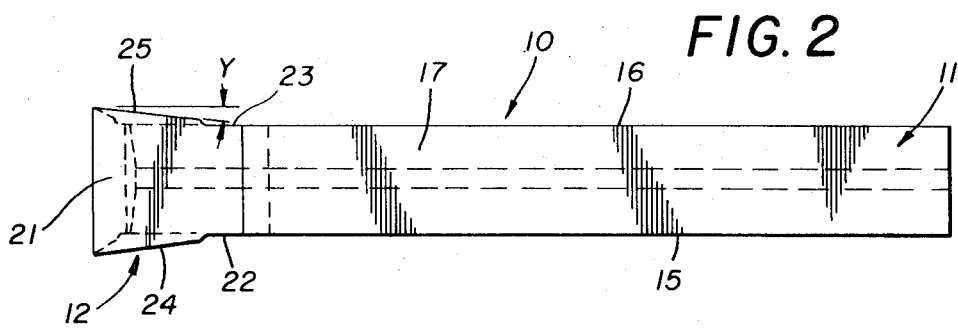

In addition to the aforementioned component parts, the tip 12 further includes a forward face 20, an upper surface 21, opposed side surfaces 22 and 23, and compound surfaces 24 and 25, with this arrangement of the aforementioned components being such that the surface 21 is co-planar with the surface 17, while the surfaces 22 and 23 are respectively substantially co-planar with the surfaces 15 and 16 when the tip is seated on the body or shank, as clearly shown in FIGS. 1, 2, and 3 of the drawings.

Referring next to FIG. 3, it will be noted that the surfaces 20 and 21 are disposed at an acute angle with each other so that their intersection defines a cutting edge 30 that extends transversely of the tool as clearly shown in the drawings, and with this acute angle providing a front clearance angle indicated by the angle X in FIG. 3 of the drawings.

Figure 4:
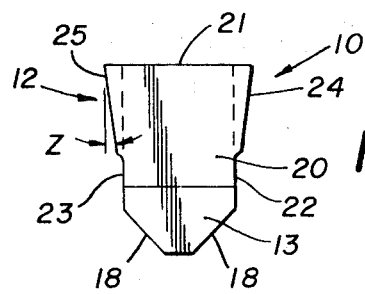

Further, in this regard, the width of the cutting edge 30 is defined by its point of intersection with the compound angle surfaces 24 and 25, with this arrangement permitting the creation of a back clearance angle Y (FIG. 2) and a side clearance angle Z (FIG. 4).

Referring again to FIGS. 1 and 3, it will be noted that the compound angle provided on the surfaces 24 and 25 (as regards surfaces 22 and 23 for example) permits the simultaneous achievement of back and side clearance angles in a localized region of the hardened cutting tip, with the cutting angle indicated being in the nature of 5° for both side and back clearance.

It will further be noted that by use of the surfaces 24 and 25 that are disposed at such a compound angle, the clearance portion of the cutting tip will be localized into a relatively smaller portion of the side elevation as evidenced from a view of FIG. 3. This arrangement further creates a generally triangular shaped portion that is indicated generally by the numeral 40 in FIG. 3 and which is triangular in front to rear cross section in the form of the invention shown in FIG. 3 of the drawings.

In use or operation of the tool, it has been found that by the configuration described above, the linear distance between the walls 22 and 23 of the tip and the walls of the cut is such that drag on the side walls is reduced. Furthermore, the increased angle of taper of the portions 24 and 25 improve the friction or drag at the cutting edge. Accordingly, improved cutting results have been achieved without inherent weakening of the tool that would otherwise occur in the instance of the use of such a high degree of clearance angle.

Thus, any grinding of clearance angles affects only the localized areas in question while the supporting areas below and behind the cutting edge 30 remain unaffected.

While the principle of this invention has been set forth in connection with cutoff inserts of the type shown in Novkov U.S. Pat. No. 2,964,833, it is to be understood that the principle illustrated is not intended to be limited to this form of tool. Thus, it is believed apparent that this principle of using a generally triangularly shaped localized cutting portion would be equally utilizable on any cutting tool that utilized a pocket or wafer-type cutting tip that requires clearance angles, with this definition being intended to include blade-like structures as well as circular blade-like devices.

It should also be noted that while the cutting portion has been shown and described as generally triangular, that other configurations could be utilized in this localized area while still employing the principles of the invention.

Similarly, this concept could also be employed on blade-like tools as well as tools having a plurality of cutting tips, such as saws for example.

Accordingly, while a full and complete description of the invention has been set forth in accordance with the dictates of the Patent Statutes, it is to be understood that the invention is not intended to be limited to the specific embodiment herein shown.

Accordingly, modifications of the invention may be resorted to without departing from the spirit hereof or the scope of the appended claims.

I claim:
1. An improved cutting tip for use on cutting tools, comprising;
   A. at least one hardened tip adapted to be supported on said cutting tool and having an integral enlarged transverse cutting portion extending transversely across said cutting tool; and
   B. said cutting portion being
      1. integral with said hardened body and
      2. having opposed side surfaces that are respectively disposed at equal compound angles with respect to the remaining opposed side surfaces of said hardened body portion and
      3. projecting transversely beyond said remaining opposed side surfaces
         a. whereby said compound surfaces provide side and back clearance areas for said cutting edge in a localized area of said hardened body.

2. The tip of claim 1 further characterized by the fact that said side and back clearance angles are equal and exceed 4° in each instance.

3. The device of claim 1 further characterized by the fact that said cutting portion is generally triangularly shaped in front to rear cross sectional view.

4. The device of claim 1 further characterized by the fact said cutting portion is approximately one-third of the cross-sectional area of said tip.

5. An improved cutting tip for use on a cutting tool, comprising;
   A. at least one hardened tip adapted to be supported on said cutting tool and having an enlarged integral transverse cutting portion extending transversely across said cutting tool; and
   B. said cutting portion being
      1. integral with said hardened body and
      2. having opposed side surfaces that are respectively disposed at equal compound angles with respect to the remaining opposed side surfaces of said hardened body portion and
      3. projecting transversely beyond said remaining opposed side surfaces
         a. whereby said compound surfaces provide side and back clearance areas for said cutting edge in a localized area of said hardened body; and
   C. said cutting tool having a bottom surface with a truncated V-shaped configuration which underlies said tip.

6. The device of claim 5 further characterized by the fact that said cutting portion is generally triangularly shaped in front to rear cross sectional view.

7. A cutting tool, comprising;
   A. an elongate body portion having
      1. opposed top and bottom surfaces
      2. opposed side surfaces
      3. a tip receiving pocket in one end thereof;
   B. a cutting tip having
      1. opposed top and bottom surfaces and a front surface
      2. a cutting edge formed by the point of juncture of said top and front surfaces
      3. opposed side walls
      4. an enlarged cutting portion adjacent said cutting edge and extending beyond said opposed side walls and forming a compound angle beyond the planes of said opposed side walls
         a. whereby side and back clearance are provided with respect to said cutting edge, with the transverse distance between said side walls remaining constant; and
   C. said cutting tip adapted to seat in said pocket.

* * * * *